Jan. 31, 1939.  E. S. GEORGE  2,145,440
LAWN MOWER HITCH
Filed Jan. 15, 1937  2 Sheets-Sheet 1

Inventor
Edwin S. George,

Jan. 31, 1939.　　　E. S. GEORGE　　　2,145,440
LAWN MOWER HITCH
Filed Jan. 15, 1937　　　2 Sheets-Sheet 2

Inventor
Edwin S. George,
By
Attorneys

Patented Jan. 31, 1939

2,145,440

UNITED STATES PATENT OFFICE 2,145,440

LAWN MOWER HITCH

Edwin S. George, Detroit, Mich.

Application January 15, 1937, Serial No. 120,663

13 Claims. (Cl. 56—7)

The present invention relates to power lawn mowers, and more particularly to mowers of the type wherein the cutting capacity is increased by the addition of trailer type cutting units or sulkies.

The primary object of the present invention is to provide means for attaching cutting reels to a wheeled mower frame whereby the reels may be swung bodily about vertical axes to an inoperative position and held in their inoperative positions while the mower is being moved from one point of operations to another. The cutting reel units are similar, as far as operation is concerned, to conventional hand operated lawn mowers. Such hand operated mowers, as is well known, have a cutting reel geared to the supporting wheels in such manner that the wheel traction causes rotation of the cutting reel when the mower is pushed in a forward direction, and while the mower is pushed rearwardly the cutting reel remains stationary. Further, these conventional lawn mowers also have a ground engaging roller for supporting the reel in the position which is correct for cutting operations. The cutting reel units here employed are similar to the hand operated mowers in the above mentioned respects, and the means for attaching the reel units to the mower unit has releasable means for holding the mower units in the position which is correct for cutting operations, and upon release thereof permits the reel units to be reversed so that the wheels thereof rotate reversely and do not cause operation of the cutting reels. In addition, the invention has means for holding the ground engaging rollers in an elevated position.

In its preferred embodiment the present reel unit attaching means is illustrated in connection with a trailer or sulky which may be attached to a powered mower unit. This is the most practical use for the same, but it will be readily apparent to those skilled in the art to which this invention pertains that reel units may be mounted on other types of vehicles than the particular one chosen for illustration.

With the above and other objects in view the invention is more fully disclosed with reference to the accompanying drawings, in which Figure 1 is a top plan of the unit;

Like characters of reference are employed throughout to designate corresponding parts.

Figure 1:
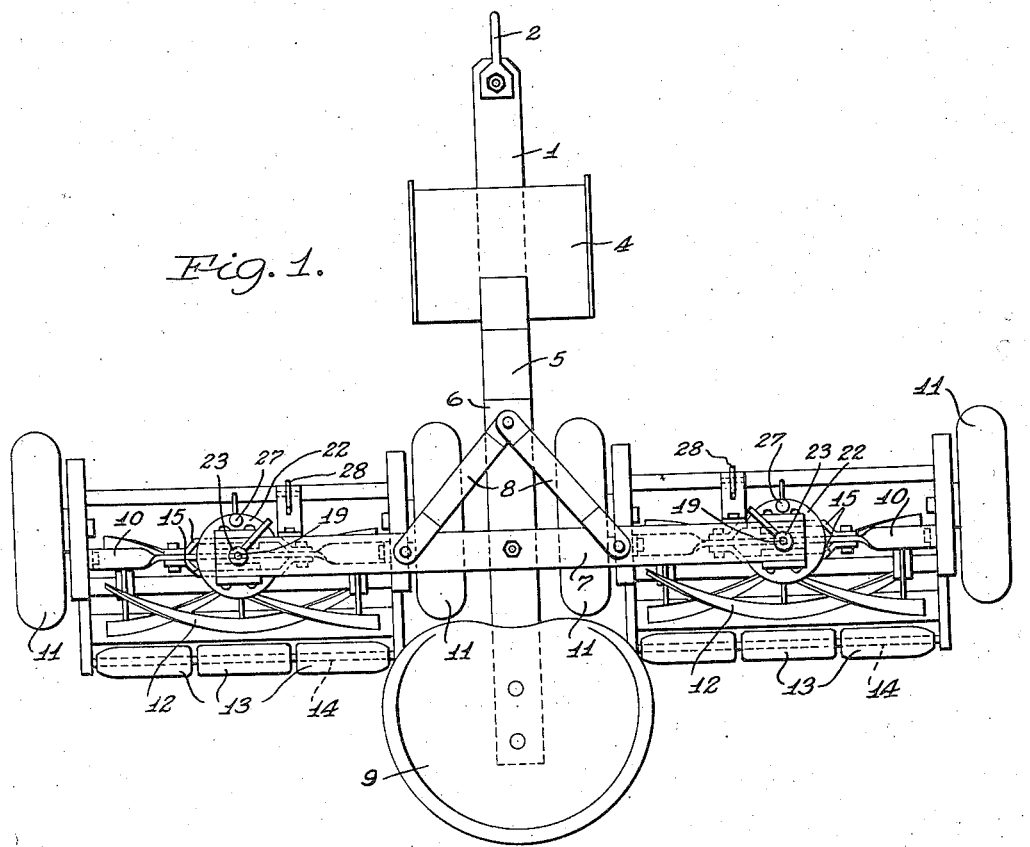
Figure 2:
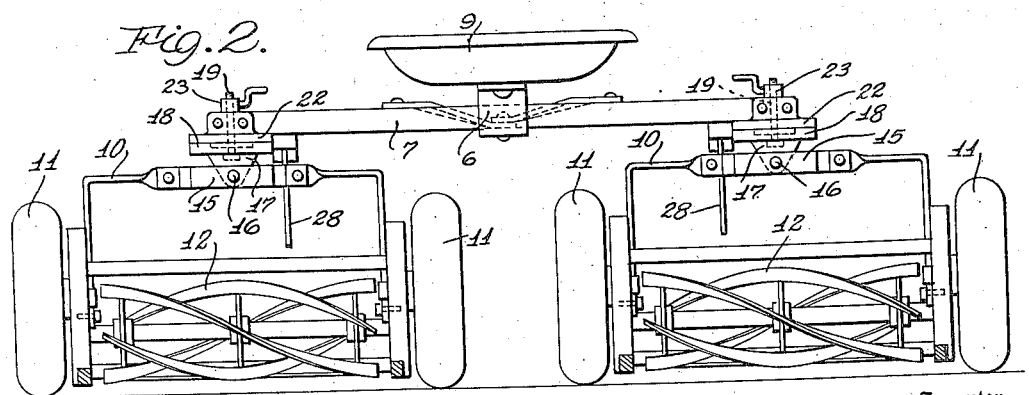
Fig. 2 is an end elevation, with certain parts removed and others in section.
Figure 3:
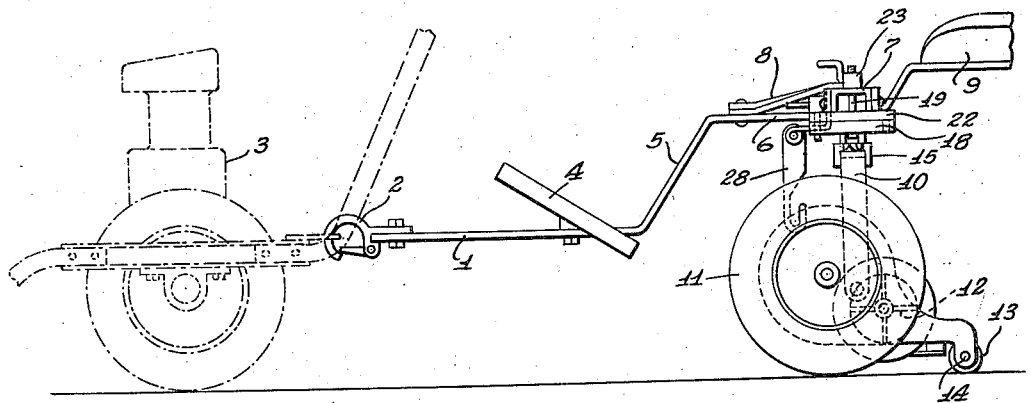
Figs. 3 and 4 are side elevations illustrating different operative stages.
Figure 4:
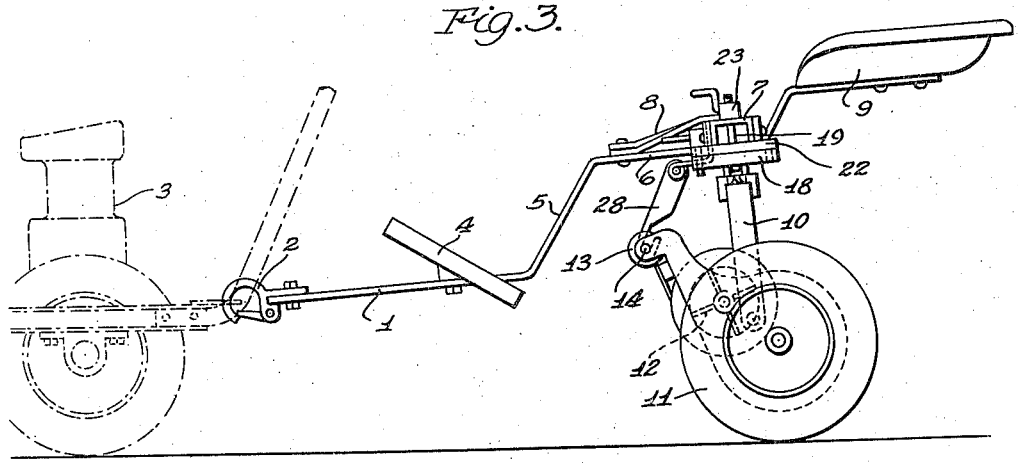

The numeral 1 designates the draw bar of a mower sulky, having a hook arrangement 2 for releasably connecting the same to a motor mower unit 3, a fragment of the latter being shown in broken lines in Figs. 3 and 4. The draw bar 1 has foot rests 4 thereon and an upwardly extending portion 5 supporting the rear end 6 in an elevated plane. A transverse bar 7 is secured to the elevated portion 6 of the draw bar and is reinforced by angle braces 8. At the rear extremity of the elevated portion 6 is mounted a seat 9 upon which the operator may ride.

At each end of the transverse bar 7 is a reel type cutter unit and each unit has an inverted U-frame 10 supported by wheels 11. Although it is not illustrated in detail, because it is already well known to those versed in this art, it will be understood that the cutting reels 12 are driven through being geared to the traction wheels 11. This arrangement and function is similar to that used in hand operated lawn mowers wherein the cutting reel rotates when the mower is pushed in a forward direction and remains idle when the mower is pushed in a rearward direction. As in the case of hand operated mowers, rollers 13 are supported by transverse rods 14 and under normal conditions of operation engage the ground surface to support the cutting reel in an operative position.

Figure 5:
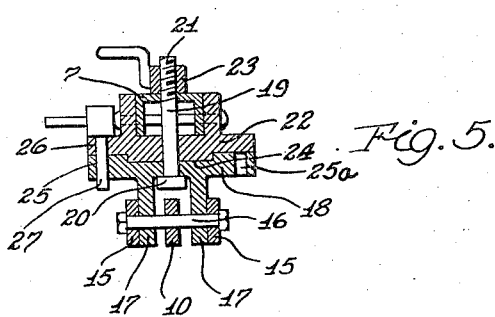
Fig. 5 is a section of a detail.

On each U-frame 10 is provided a pair of reinforcing straps 15, and a pin 16 extends through the straps 15 and U-frame member and also through the ears 17 on a bearing plate 18 to attach the U-frame to the bearing plate in a manner permitting the U-frame to fulcrum about a substantially horizontal axis. A king pin 19 has a head 20 at one end and its other end 21 screwthreaded. The king pin 19 extends vertically through a central opening in the bearing plate 18, through a central opening in a bearing plate 22 which rests upon the bearing plate 18, and through an opening adjacent the end of the transverse bar 7 to which the bearing plate 22 is rigidly connected. A hand nut 23 on the screwthreaded end 21 of the king pin draws the plates 18 and 22 together and ties them to the transverse bars 7. Upon reference to Fig. 5, it will be seen that the plate 18 has a co-axial depression 24 receiving a co-axial protuberance on the plate 22, and this interlocked arrangement prevents lateral displacement of the two plates 18 and 22 and, therefore, relieves the king pin 19 of a part of its load.

It becomes obvious from the foregoing description that the U-frames 10 are detachably secured to the transverse bar 7. That is, by removing the nut 23, the plates 18 and 22 may be separated, and by tightening the nut 23, the plates 18 and 22 may be tightly clamped together.

In order to prevent positively relative rotation of the two bearing plates 18 and 22 the plate 18 is provided with two apertures 25, 25a spaced one hundred and eighty degrees apart, and the bearing plate 22 is provided with an aperture 26 through which a locking pin 27 is extended so that its end projects into one of the apertures 25, 25a. This structure is adapted to lock the two bearing plates at two stages in their relative rotation, one stage representing the position of forward movement of the mower unit and the other representing the position of reverse movement of the mower unit. In other words, with the pin 27 in the apertures shown in Fig. 5 movement of the sulky in a forward direction causes forward movement of the mower units and rotation of their cutting wheels. With the plate 18 rotated through one hundred and eighty degrees, upon removal of the pin 27 and loosening of the nut 23, the aperture 25 which is opposite to the one in which the pin 27 is shown is aligned with the aperture 26 so that the pin 27 upon being replaced holds the mower in a position where forward movement of the sulky causes the mower to move in its reverse direction, with the result that the cutting reel remains stationary.

Hooks 28 are mounted on the transverse bar 7 adjacent each mower, and when the mowers have been reversed, as above described, the reel units are manually tipped to the position shown in Fig. 4 and the hooks 28 are placed in engagement with the rods 14. The reel units are thus held in a tipped position with the rollers 13 out of engagement with the ground, and as the sulky is moved forwardly the cutting reels remain idle.

Although a specific embodiment of the invention has been illustrated and described it will be understood that various changes may be made within the scope of the appended claims without departing from the spirit of the invention, and such changes are contemplated.

What I claim is:—

1. The combination with a mower frame and a wheeled cutting unit having a rotatable cutter, of means for attaching said cutting unit to said frame, said means comprising elements relatively rotatable about a substantially vertical axis and connected to said frame and cutting unit respectively, said cutting unit being movable about said axis from one position to another, said cutter being operable in one of said positions only and by and upon rotation of the wheels, and releasable means for holding said elements against relative rotation in either of said positions.

2. The combination with a mower frame and a wheeled cutting unit having a rotatable cutter, of means for attaching said cutting unit to said frame, said means comprising elements relatively rotatable about a substantially vertical axis, said cutting unit being movable about said axis from one position to another, said cutter being operable in one of said positions only and by and upon rotation of the wheels, releasable means attaching one of said elements to said frame, means including a horizontal fulcrum connecting the other element to said unit, and releasable means for holding said parts against relative rotation in either of said positions.

3. The combination with a mower frame and a wheeled cutting unit, of means for attaching said cutting unit to said frame, said means comprising elements relatively rotatable about a substantially vertical axis and connected to said frame and cutting unit respectively, and means for locking said elements against relative rotation, said last named means being operative at two stages in the relative rotation of said elements with the stages being one hundred and eighty degrees apart.

4. The combination with a mower frame and a wheeled cutting unit, of means for attaching said cutting unit to said frame, said means comprising elements relatively rotatable about a substantially vertical axis, releasable means attaching one of said elements to said frame, means including a horizontal fulcrum connecting the other element to said unit, and means for locking said elements against relative rotation, said last named means being operative at two stages in the relative rotation of said elements with the stages being one hundred and eighty degrees apart.

5. The combination with a mower frame and a wheeled cutting unit having a rotatable cutter, of means for attaching said cutting unit to said frame, said means comprising elements relatively rotatable about a substantially vertical axis and connected to said frame and cutting unit respectively, said cutting unit being movable about said axis from one position to another, said cutter being operable in one of said positions only and by and upon rotation of the wheels, and releasable means for holding said elements against relative rotation in either of said positions, and means on said frame for engaging said unit to support the same in an inclined position.

6. The combination with a mower frame and a wheeled cutting unit having a rotatable cutter, of means for attaching said cutting unit to said frame, said means comprising elements relatively rotatable about a substantially vertical axis, said cutting unit being movable about said axis from one position to another, said cutter being operable in one of said positions only and by and upon rotation of the wheels, releasable means attaching one of said elements to said frame, means including a horizontal fulcrum connecting the other element to said unit, releasable means for holding said parts against relative rotation in either of said positions, and means on said frame for engaging said unit to support the same in an inclined position.

7. The combination with a mower frame and a wheeled cutting unit, of means for attaching said cutting unit to said frame, said means comprising elements relatively rotatable about a substantially vertical axis and connected to said frame and cutting unit respectively, means for locking said elements against relative rotation, said last named means being operative at two stages in the relative rotation of said elements with the stages being one hundred and eighty degrees apart, and means on said frame for engaging said unit to support the same in an inclined position when said elements are in one of said two stages.

8. The combination with a mower frame and a wheeled cutting unit, of means for attaching said cutting unit to said frame, said means comprising elements relatively rotatable about a substantially vertical axis, releasable means attaching one of said elements to said frame, means including a horizontal fulcrum connecting the other element to said unit, means for locking said elements against relative rotation, said last named means being operative at two stages in the relative rotation of said elements with the stages being one hundred and eighty degrees apart, and means on said frame for engaging said unit to support the same in an inclined position when said elements are in one of said two stages.

9. The combination with a cutting unit wherein a cutting reel is driven by forward rotation of its supporting wheels and wherein the reel remains idle during reverse rotation of the cutting reel, and a mower frame, of means for attaching said cutting unit to said frame, said means comprising a vertical trunnion about which said unit may be swung to positions where the unit wheels rotate forwardly with forward travel of the frame and to a position where the wheels rotate reversely with forward travel of the frame, and means for locking said fulcrum with the unit in either of said two positions.

10. The combination with a cutting unit wherein a cutting reel is driven by forward rotation of its supporting wheels and wherein the reel remains idle during reverse rotation of the cutting reel, and a mower frame, of means for attaching said cutting unit to said frame, said means comprising a vertical trunnion about which said unit may be swung to positions where the unit wheels rotate forwardly with forward travel of the frame and may be swung to a second position in which the wheels rotate reversely with forward travel of the frame, means for locking said fulcrum with the unit in either of said two positions, and means for holding said unit in an inclined position, said last named means being operative with the unit in a position with its wheels reversely rotating.

11. A mower comprising a bar extending transverse to the direction of movement of the mower, a plurality of wheeled cutting units, means attaching said units to said bar for movement of each about a vertical axis, and releasable means for holding said last named means stationary.

12. In a power mowing machine, a frame, a cutting unit mounted on wheels and having a cutter, said unit being reversible from one position in which the cutter is actuated on rotation of the wheels in one direction to another position in which the cutter is inactive on rotation of the wheels in the opposite direction, and releasable means to connect said unit to said frame in one or the other of said positions.

13. In a power mowing machine, a frame, a bearing member rigidly secured to said frame and having a downwardly directed bearing surface, a cutting unit mounted on wheels and having a cutter, said unit being bodily reversible from one position in which the cutter is actuated by and on rotation of the unit wheels in one direction to another position in which the cutter remains inactive on rotation of the unit wheels in an opposite direction, a bearing member pivotally connected to said unit and having an upwardly directed bearing surface engageable with said first-named bearing surface, said bearing members having cooperating interlocking means, and releasable means connecting said bearing members together.

EDWIN S. GEORGE.